United States Patent [19]

Davies et al.

[11] Patent Number: 5,130,549

[45] Date of Patent: Jul. 14, 1992

[54] METHOD OF DETECTING OR MEASURING NUCLEAR RADIATION

[76] Inventors: Geoffrey J. Davies, 36 Boundary Rd., Linden Extension, Randburg, Transvaal; Tom L. Nam, 114 6th Ave., Bez Valley, Johannesburg, Transvaal; Rex J. Keddy, 3 Bevan Road, Rivonia, Transvaal; Lesley K. Hedges, 4 Oriole Mews, Delphinium Street, Brackenhurst,Transvaal, all of South Africa

[21] Appl. No.: 494,945

[22] Filed: Mar. 14, 1990

Related U.S. Application Data

[63] Continuation of Ser. No. 257,345, Oct. 13, 1988, abandoned.

[30] Foreign Application Priority Data

Oct. 16, 1987 [ZA] South Africa ............... 87/7791

[51] Int. Cl.⁵ .................................................. G01T 1/00
[52] U.S. Cl. .............................. 250/484.1; 250/327.2; 252/301.4 R; 252/301.4 F; 252/301.4 P; 423/290
[58] Field of Search ............... 423/290; 250/484.1, 250/327.2 A; 252/301.4 R, 301.4 F, 301.4 P

[56] References Cited

U.S. PATENT DOCUMENTS

| | | | |
|---|---|---|---|
| 3,192,015 | 4/1963 | Wentoff, Jr. ............... | 23/191 |
| 4,551,195 | 11/1985 | Iizuka et al. ............... | 156/603 |
| 4,699,687 | 10/1987 | Yazu et al. ............... | 156/603 |
| 4,772,575 | 9/1988 | Ota et al. ............... | 423/290 |

FOREIGN PATENT DOCUMENTS

| | | | |
|---|---|---|---|
| 53-102900 | 9/1978 | Japan ............... | 423/290 |
| 62-40376 | 2/1987 | Japan ............... | 423/290 |
| 951280 | 3/1964 | United Kingdom . | |

OTHER PUBLICATIONS

Journal of the American Ceramic Society-Hirano et al. vol. 64 No. 12 pp. 734-736 Lysanov, et al. Zhuranl Vses. Khim. Ob-va D. I. Mendeleeva, vol. 30, No. 6 pp. 56-63, 1985.
Journal of Materials Science 14 (1979) Endo, et al. pp. 1676-1690.
Journal of Materials Science 16 (1981) Endo, pp. 2227-2232.
Fukunaga, Journal De Physique Col. C8, Supp. 11 vol. 45 Nov. 1984 pp. C8-315 to C8-324.
Halperim et al. "Phys. Chem. Solids", vol. 36, pp. 89-93, 1975.

Primary Examiner—Jack Cooper
Attorney, Agent, or Firm—Scully, Scott, Murphy & Presser

[57] ABSTRACT

Cubic boron nitride having an impurity profile as set out below has been found to exhibit excellent thermoluminescent properties with a high gamma radiation sensitivity and low light sensitivity:

| Impurity | Content - less than |
|---|---|
| Carbon | 1100 ppm |
| Oxygen | 1500 ppm |
| Silicon | 100 ppm |
| Phosphorus | 30 ppm |
| Titanium | 30 ppm |
| Beryllium | 1 ppm |

6 Claims, No Drawings

METHOD OF DETECTING OR MEASURING NUCLEAR RADIATION

This application is a continuation of application Ser. No. 257,345, filed Oct. 13, 1988 now abandoned.

BACKGROUND OF THE INVENTION

This invention relates to a thermoluminescent material useful in the detection, counting or otherwise measuring of nuclear radiation.

Nuclear radiation is radiation that has its genesis within the nucleus of the atom. Examples of such radiation are radiation by X-rays, alpha particles, neutrons, protons, electrons and gamma rays.

It has been proposed to use diamond of low nitrogen content as a thermoluminescent material in the detection of nuclear radiation—European Patent Publication No. 0195678. Such diamond particles are available from natural sources or may be produced synthetically. Whilst diamond has been shown to be an excellent human tissue equivalent detector of ionising radiation cubic boron nitride with an effective atomic no of 6.8 is an even closer tissue equivalent material.

Cubic boron nitride (CBN) has also been described in the literature as having thermoluminescent properties. Reference in this regard may be had of the paper by A. Halperin and A. Katzir entitled "Electrical Conductivity, Absorption and Luminescence Measurements in Cubic Boron Nitride", Phys. Chem. Solids, 1975, Vol. 36, pp. 89–93.

SUMMARY OF THE INVENTION

It has now been found that CBN having an impurity profile as specified below exhibits thermoluminescent properties with high gamma radiation sensitivity and low light sensitivity. The CBN has an impurity profile as set out below:

| Impurity | Content - less than |
|---|---|
| Carbon | 1100 ppm |
| Oxygen | 1500 ppm |
| Silicon | 100 ppm |
| Phosphorus | 30 ppm |
| Titanium | 30 ppm |
| Beryllium | 1 ppm |

The CBN may contain other impurities, but these six impurities must not be present in any greater amount than that specified.

The CBN will typically be made from hexagonal boron nitride (HBN) which has a similar impurity profile.

The CBN has utility in the detection, counting or other measurement of nuclear radiation, particularly gamma radiation. The invention provides the CBN for such use.

According to another aspect of the present invention, there is provided a body for use in detecting, counting or otherwise measuring nuclear radiation comprising a mass of the CBN bonded into a coherent form or held against movement in a suitable container.

According to yet another aspect of the invention, there is provided a method of making a bonded mass of the CBN including the steps of placing a mass of the CBN in contact with a mass of a second phase, exposing the CBN and second phase to conditions of elevated temperature and pressure suitable for compact manufacture thereby producing a compact comprising the CBN bonded into a coherent form and having the second phase uniformly dispersed therethrough and optionally removing substantially all the second phase from the coherent form.

DETAILED DESCRIPTION OF THE INVENTION

An example of a particularly suitable CBN has an impurity profile as set out below:

| Impurity | Content (ppm) |
|---|---|
| Carbon | 1000 |
| Oxygen | less than 1500 |
| Silicon | 10 |
| Phosphorus | 10 |
| Titanium | 0,3 |
| Beryllium | less than 0,1 |

The CBN may be made by methods known int he art using an HBN as starting material. This HBN will typically have an impurity profile similar to that of the CBN. The CBN may be made using an alkaline earth metal nitride such as a mixture of calcium nitride and magnesium nitride, as catalyst. Particles produced using this catalyst are generally white. Other catalysts such as a mixture of lithium nitride and calcium nitride (producing orange particles) or a mixture of lithium nitride and magnesium diboride (producing black particles) may also be used.

The CBN body when in bonded, coherent form may have a size which renders it easily mountable in a suitable detection device or apparatus.

Exposing the CBN to nuclear radiation causes electrons or holes to be trapped at lattice imperfections within the CBN crystal structure. Heating the CBN then causes at least some of these electrons or holes to be released from their traps, return to stable energy states and emit light, i.e. to luminesce. This property may be utilised in the detection and/or measurement of the nuclear radiation, particularly gamma radiation. The temperature to which the CBN should be subjected to cause it to luminesce will be above ambient and below 500° C. The preferred temperature is 200° to 500° C., more preferably 250° to 400° C.

The CBN body when in bonded, coherent form may be produced using known and standard CBN compact manufacture conditions. Essential to this method is that the second phase, in producing the compact, does not become significantly radioactive when subjected to nuclear radiation. Examples of a suitable second phase are silicon and glass.

The CBN body when in bonded, coherent form will generally be produced in disc form and may be used in this form. Alternatively, the disc may be cut by known techniques into a number of other bodies having a variety of shapes.

When the CBN body comprises a mass of CBN particles held against movement in a suitable container, the CBN particles will generally be in discrete, unbonded form. An example of a suitable container consists of two co-operating parts which may be clipped or otherwise secured together to define a cavity which receives the CBN particles. The cavity should be filled to an extent that little or no movement of the particles is possible. One possible use for the container thus filled is as a detector in radiotherapy. The container must, of course, be made of a material which is transparent to the radiation and does not luminesce when heated after being subjected to the radiation. The container may also be a vial.

CBN particles were produced using a variety of sources of HBN. The CBN particles thus produced were subjected to gamma radiation and thereafter heated and the thermoluminescent response determined. In particular, the gamma radiation sensitivity of each CBN material as well as the light sensitivity of each CBN material was determined. The results are set out in Table I. It will be noted that the CBN having the impurity profile of the invention (Item A) had the desirable combination of high gamma sensitivity and low light sensitivity when compared with all the other CBN particles.

TABLE I

| Item | γ Sensitivity | Light Sensitivity | C | O$_2$ | Al | Si | P | S | Mg | Ca | Ti | Cr | As | Fe |
|---|---|---|---|---|---|---|---|---|---|---|---|---|---|---|
| A | 1328 | 31 | 1000 | <1500 | 20 | 10 | 10 | <30 | 10000 | 200 | 0.3 | 3 | 1 | 3 |
| B | 13.5 | 28 | 1000 | 5000 | 100 | 300 | 30 | <30 | 10000 | 200 | 0.3 | 3 | 0.3 | 1 |
| C | 71 | 149 | 30000 | 15000 | 30 | 1000 | 30 | <30 | 30000 | 10000 | 30 | 3 | 1 | 3 |
| D | 48.3 | 58.6 | 10000 | 15000 | 30 | 300 | 10 | <30 | 30000 | 100 | 1 | 1 | 1 | 1 |
| E | 1040 | 611 | 5000 | 3000 | 30 | 100 | 10 | <30 | 30000 | 3000 | 30 | 3 | 1 | 5 |
| F | 640 | 911 | 3000 | 15000 | 1000 | 3000 | 100 | <30 | 20000 | 1000 | 100 | 30 | 1 | 100 |

In each example above, there was no detectable, i.e. less than 0.1 ppm, beryllium in the CBN.

Further in each example above, the HBN source material had a carbon, oxygen, silicon, phosphorus, titanium and beryllium impurity profile essentially the same as that of the CBN produced.

We claim:

1. A method of detecting or measuring nuclear radiation including the steps of subjecting a material capable of thermoluminescence consisting essentially of cubic boron nitride which has the impurities set out below in an amount less than that specified in the content column:

| Impurity | Content (ppm) |
|---|---|
| Carbon | 1100 |
| Oxygen | 1500 |
| Silicon | 100 |
| Phosphorus | 30 |
| Titanium | 30 |
| Beryllium | 1 | to nuclear radiation, heating the irradiated material to a temperature in the range 200° C. to 500° C. to cause the material to luminescence and detecting or measuring the thermoluminescent response.

2. A method of claim 1 wherein said material capable of thermoluminescence comprising cubic boron nitride has an impurity profile set out below:

| Impurity | Content (ppm) |
|---|---|
| Carbon | 1000 |
| Oxygen | less than 1500 |
| Silicon | 10 |
| Phosphorus | 10 |
| Titanium | 0.3 |
| Beryllium | less than 0.1 |

3. A method according to claim 1 wherein the material is heated to a temperature in the range 250° C. to 400° C.

4. A method of claim 3 wherein said material capable of thermoluminescence comprising cubic boron nitride has an impurity profile set out below:

| Impurity | Content (ppm) |
|---|---|
| Carbon | 1000 |
| Oxygen | less than 1500 |
| Silicon | 10 |
| Phosphorus | 10 |
| Titanium | 0.3 |
| Beryllium | less than 0.1 |

5. A method according to claim 1 wherein the radiation detected or measured is gamma radiation.

6. A method of claim 2 wherein said material capable of thermoluminescence comprising cubic boron nitride has an impurity profile set out below:

| Impurity | Content (ppm) |
|---|---|
| Carbon | 1000 |
| Oxygen | less than 1500 |
| Silicon | 10 |
| Phosphorus | 10 |
| Titanium | 0.3 |
| Beryllium | less than 0.1 |

* * * * *